Patented Aug. 24, 1937

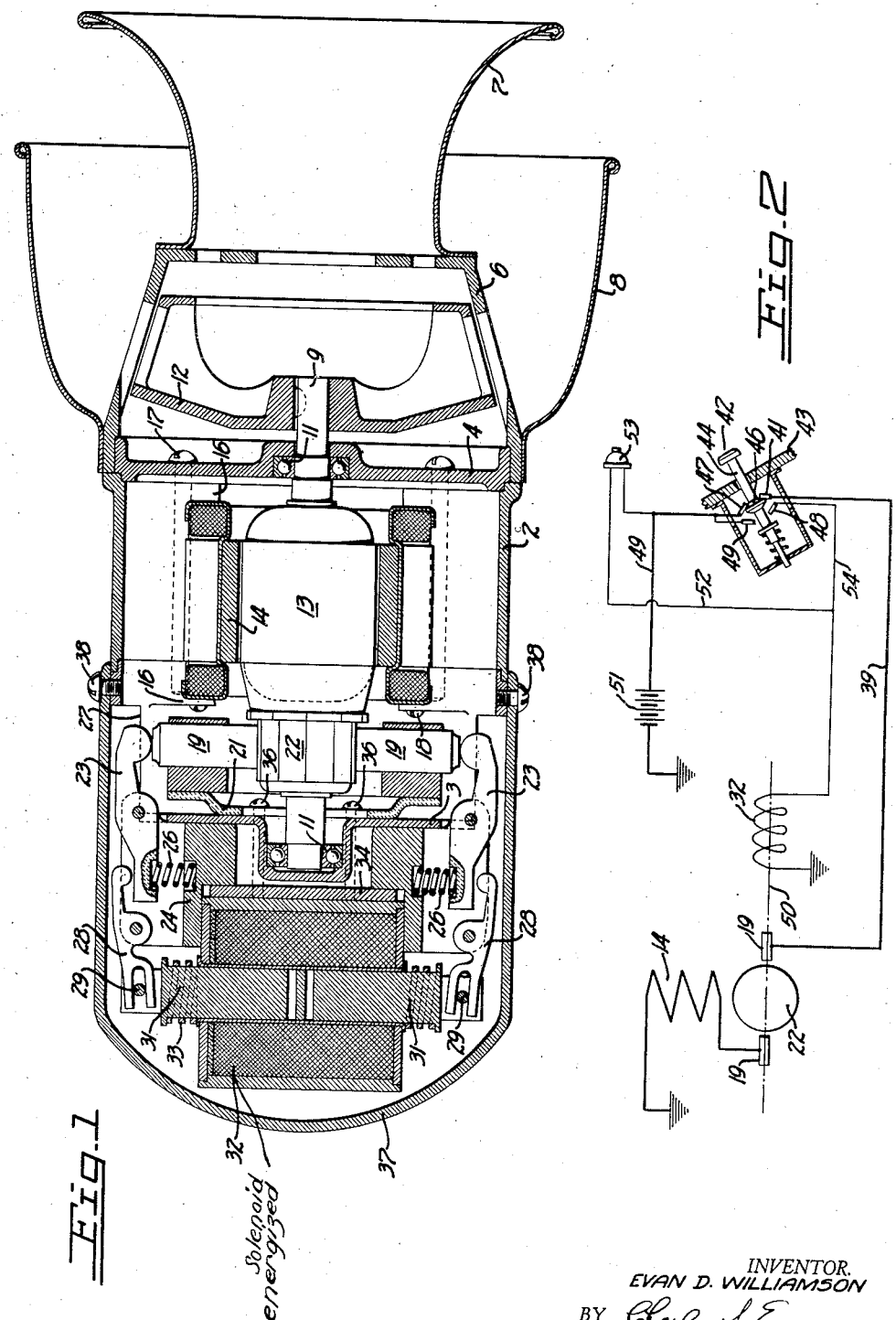

2,090,926

UNITED STATES PATENT OFFICE 2,090,926

SIREN AND MEANS FOR CONTROLLING THE SAME

Evan D. Williamson, San Francisco, Calif., assignor to E. D. Bullard Company, San Francisco, Calif., a corporation of California Application April 13, 1935, Serial No. 16,202

8 Claims. (Cl. 171—324)

My invention relates to motor operated devices, such as electric sirens.

It is among the objects of my invention to provide improved means for relieving the brush pressure on a motor commutator, so that an armature and connected rotor, such as the sounding rotor of a siren, are free to revolve without frictional drag.

Another object of my invention is to provide means for accomplishing the above object without interfering with the setting of the brushes, or the adjusted brush pressure.

A further object of my invention is to provide an improved electric control for a siren.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a horizontal sectional view of a siren embodying the improvements of my invention; and Figure 2 is a wiring diagram.

In terms of broad inclusion, the siren embodying my invention comprises an electric motor having an armature and associated commutator and brushes. The sounding rotor of the siren is mounted directly on the armature shaft of the motor. Springs are provided for pressing the brushes against the commutator, and means comprising a counter-acting control spring are provided for removing the spring pressure from the brushes to de-energize the armature and simultaneously relieve the commutator of brush drag. The activity of the control spring is regulated by an improved solenoid arrangement.

In greater detail, and referring particularly to Figure 1 of the drawing, the siren chosen for purposes of illustration and embodying the improvements of my invention comprises a split housing having a forward cylindrical portion 2 and a cup-shaped rear portion 3. An end plate 4 is provided on the forward end of the housing, upon which the sounding unit is mounted. The latter unit comprises a ported casing 6 carrying sound deflectors and projectors 7 and 8. A shaft 9 is journaled in the end portion 3 of the housing and in the forward end plate 4 is suitable bearings 11, and carries on its forward projecting end the sounding rotor 12 arranged within the ported casing 6.

The shaft 9 also carries the armature 13 of the motor which drives the siren. By this arrangement a single rotating element is provided, having a minimum of frictional resistance, and capable of rotating for a considerable period of time after the current to the motor has been cut off. The field 14 of the motor is clamped between the two halves of the split housing, and is held by lugs 16 projecting inwardly from the housing wall. The several elements are held in assembled relation by screws 17 extending through the end plate 4 and threaded in the outer lugs 16. The field 14 is also preferably fastened to the outer lugs 16 by suitable screws 18 so that when the assembly screws 17 are withdrawn, the field 14 will be dismantled as a part of the outer housing portion 3.

The brushes 19 are mounted in a suitable holder 21 so that the brushes may slide freely toward and away from the commutator 22. Each brush is pressed against the commutator by a lever 23 pivoted on a mounting block 24 and having a spring 26 compressed between the block and the rear end of the lever. Suitable slots 27 cut in the wall of the rear housing portion 3 provide openings, whereby the forward ends of the levers 23 may contact the brushes 19. The levers 23 are preferably made of an insulating material, such as a condensate composition.

Means are provided for removing the spring pressure from the brushes to stop the flow of current to the armature and to simultaneously relieve the armature of the brush drag on the commutator. By relieving the armature of this frictional drag when the current is cut off, the armature 13 and connected sounding rotor 12 are free to spin and the inertia of these parts will maintain the signal for a considerable period after the motor has been de-energized. The means for removing the spring pressure from each brush preferably comprises a second pair of levers 28, also pivoted on the mounting block 24. The forward ends of these levers bear on the rear portions of the brush levers 23 opposite the springs 26. The rear ends of the levers 28 are slotted to engage pins 29 on plungers 31.

These plungers are of magnetic material and project into the ends of a solenoid 32, and control springs 33 are compressed between the outer ends of the plungers and the ends of the solenoid. When the solenoid is energized (by a suitable circuit controlled by the operator) the plungers 31 are simultaneously drawn inwardly against the action of the control springs 33. This movement shifts the levers 28 out of engagement with the brush levers 23 so that the latter are free to exert their full spring loaded pressure on the brushes. The control spring therefore does not interfere with the adjusted spring pressure on the brushes. At this time the motor operates to sound the siren in the usual manner.

When the solenoid is de-energized the control springs 33 are released to drive the plungers 31 outwardly, which causes the levers 28 to bear downwardly on the outer ends of the spring pressed levers 23. Under these conditions the pressure is relieved from the brushes and the latter are automatically thrown outwardly from the rotating commutator. This cuts off the current to the armature, while at the same time relieves the latter of the frictional drag on the commutator. The subsequent free running of the armature and connected sounding rotor 12 will maintain the signal for an appreciable length of time.

The solenoid 32 is preferably mounted on a plate 34 which lies against the base of a recess provided in the rear end of the mounting block 24. Suitable screws 36 passing through the brush holder 21, housing portion 3 and mounting block 24, and threaded into the plate 34, operate to hold all of these parts in assembled relation. A cup-shaped casing 37 is preferably provided for this external mechanism and is suitably secured to the housing, as by the screws 38.

Figure 2 shows a wiring diagram embodying further improvements embodying my invention. In this circuit one side of the motor field is grounded and the other side is connected to one of the brushes 19; these brushes being shown in their normal position away from the commutator 22. The other brush is connected by a lead 39 to contact 41 of a switch 42 mounted on the floor board 43. This switch comprises a spring pressed plunger 44 having a contactor 46 normally bridging the contacts 41 and 47. Two other contacts 48 and 49 are positioned so that when the plunger 44 is pressed inwardly the contactor 46 will close a circuit through them; it being understood that when the contactor is bridging the inner contacts it is away from the outer contacts 41 and 47, so that the circuit through the latter is open.

The outer contact 47 is connected by a lead 49 to the ungrounded side of the automobile battery 51. This completes the circuit through the siren motor, and whenever this circuit is closed by pressing the brushes against the commutator the motor will operate. The brushes are allowed to press against the commutator when the solenoid 32 is energized, as was described in detail in connection with Figure 1. In Figure 2 the operative connection between the solenoid and brushes is indicated by the dot and dash line 50. The solenoid 32 has one side grounded and has its other end connected by a lead 52 to the battery 51. A push button 53, conveniently positioned near the hand of the driver, is interposed in this lead. When the button 33 is pressed therefore, the solenoid 32 is energized to allow the brushes to be pressed against the commutator and start the motor. The motor will then keep running as long as the push button 53 is held closed.

When the push button 53 is released the pressure on the brushes is removed and the motor circuit is opened. The motor armature will then run freely and continue the signal until the inertia of the moving parts is overcome. This continued signal is often desired. On occasion however it is desirable to stop the signal promptly after the motor is de-energized. For this purpose brake means are provided for stopping the armature. In my improved siren, the brushes themselves are used to provide the braking resistance. As shown in Figure 2, the solenoid 32 is also connected by a lead 54 to the lower contact 48 of the switch 42; the other lower contact 49 being connected to the battery.

When the switch 42 is pressed inwardly the solenoid is again energized to allow the brushes to press against the commutator. At this time, however the motor circuit is broken by the contactor 46, so that the brushes 19 merely function as friction resistance elements. The braking action of the brushes will of course apply as long as the switch 42 is held in.

I claim:

1. In an electric motor having an armature and associated commutator and brushes, loaded springs for pressing the brushes against the commutator, means including a control spring working against said brush springs for removing the spring pressure from the brushes, and electrically actuated means for rendering the control spring inoperative.

2. In an electric motor having an armature and associated commutator and brush, a compressed spring for pressing the brush against the commutator, a compressed control spring working against the brush spring for compressing the latter to remove the pressure from the brush, and electrically controlled means for compressing the control spring to extend the brush spring.

3. In an electric motor having an armature and associated commutator and brush, a compressed spring for pressing the brush against the commutator, a compressed control spring working against the brush spring for compressing the latter to remove the pressure from the brush, a solenoid, and a plunger associated with the solenoid and connected with the control spring for compressing the latter to extend the brush spring.

4. In an electric motor having an armature and associated commutator and brushes, compressed springs for pressing the brushes against the commutator, compressed control springs working against the brush springs for compressing the latter to remove the pressure from the brushes, a solenoid, and plungers in the ends of the solenoid and connected with the control springs for compressing the latter to extend the brush springs.

5. In an electric motor having an armature and associated commutator and brush, a spring pressed lever bearing against the brush for pressing the latter against the commutator, and a second spring pressed lever bearing against the first lever for retracting said first lever from the brush.

6. In an electric motor having an armature and associated commutator and brush, a spring pressed lever bearing against the brush for pressing the latter against the commutator, a second spring pressed lever bearing against the first lever for retracting said first lever from the brush, and means for moving the second lever away from the first.

7. In an electric motor having an armature and associated commutator and brushes, a pair of spring pressed levers bearing against the brushes for pressing the latter against the commutator, a second pair of spring pressed levers bearing against the first levers for retracting the latter from the brushes, a solenoid, and plungers in the ends of the solenoid and connected with said second levers for moving the latter away from the first levers.

8. An electrical device comprising an electric motor having an armature and associated commutator and brushes, a rotor, a shaft upon which both the armature and rotor are mounted, loaded springs for pressing the brushes against the commutator, and electrically controlled means for removing the spring pressure from the brushes, said latter means being entirely disengaged from the springs when the motor is operating so that the springs are free to exert their full loaded pressure on the brushes.

EVAN D. WILLIAMSON.